United States Patent
McManis, Jr. et al.

(10) Patent No.: US 10,157,178 B2
(45) Date of Patent: Dec. 18, 2018

(54) IDENTIFYING CATEGORIES WITHIN TEXTUAL DATA

(71) Applicant: International Business Machines Corporation, Armonk, NY (US)

(72) Inventors: Charles E. McManis, Jr., Austin, TX (US); Douglas A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/017,403

(22) Filed: Feb. 5, 2016

(65) Prior Publication Data

US 2016/0232226 A1    Aug. 11, 2016

Related U.S. Application Data

(60) Provisional application No. 62/113,087, filed on Feb. 6, 2015.

(51) Int. Cl.
*G06F 17/30* (2006.01)
*G06F 17/27* (2006.01)

(52) U.S. Cl.
CPC ........ *G06F 17/2785* (2013.01); *G06F 17/275* (2013.01); *G06F 17/30707* (2013.01)

(58) Field of Classification Search
CPC .............. G06F 17/2785; G06F 17/275; G06F 17/30707
USPC ....................................................... 707/740
See application file for complete search history.

(56) References Cited

U.S. PATENT DOCUMENTS

| | | | | |
|---|---|---|---|---|
| 6,665,661 | B1 * | 12/2003 | Crow | G06F 17/30616 |
| 9,514,219 | B2 * | 12/2016 | Robinson | G06F 17/30707 |
| 2003/0041072 | A1 * | 2/2003 | Segal | G06F 17/3061 |
| 2006/0123000 | A1 * | 6/2006 | Baxter | G06F 17/3061 |
| 2006/0222239 | A1 * | 10/2006 | Bargeron | G06K 9/00442 382/159 |
| 2008/0294621 | A1 * | 11/2008 | Kanigsberg | G06F 17/30867 |
| 2009/0055185 | A1 * | 2/2009 | Nakade | G10L 15/30 704/257 |
| 2009/0307213 | A1 * | 12/2009 | Deng | G06F 17/30705 |
| 2011/0213655 | A1 * | 9/2011 | Henkin | G06Q 30/00 705/14.49 |
| 2012/0078883 | A1 * | 3/2012 | Melby | G06F 17/3064 707/722 |
| 2012/0221496 | A1 * | 8/2012 | Goyal | G06F 17/30705 706/12 |
| 2014/0280148 | A1 * | 9/2014 | Stankiewicz | G06F 17/30908 707/737 |
| 2015/0142811 | A1 * | 5/2015 | Henry | G06F 17/30598 707/738 |
| 2016/0005395 | A1 * | 1/2016 | Williams | G06F 3/167 704/244 |

(Continued)

*Primary Examiner* — Thanh-Ha Dang
(74) *Attorney, Agent, or Firm* — Zilka-Kotab, P.C.

(57) ABSTRACT

A computer-implemented method according to one embodiment includes identifying a plurality of documents associated with a predetermined subject, where each of the plurality of documents contains textual data, analyzing the textual data of each of the plurality of documents to identify one or more categories within the plurality of the documents, and returning the one or more categories identified within the plurality of the documents.

20 Claims, 6 Drawing Sheets

(56) References Cited

U.S. PATENT DOCUMENTS

2016/0162576 A1* 6/2016 Arino de la Rubia ...................... G06F 17/2765 707/739
2017/0294190 A1* 10/2017 Lindle ................. G06F 17/2258

* cited by examiner

IDENTIFYING CATEGORIES WITHIN TEXTUAL DATA

BACKGROUND

The present invention relates to document classification, and more specifically, this invention relates to analyzing and classifying textual data within a plurality of documents.

Data classification is an important element in performing data analysis and management. There are a large number of websites that may be served by computers on the Internet, accessible by many devices. There is a large amount of textual data contained in all the web pages, as well as textual data stored in offline or local network data storage, and there is a need for indexing and classification of this text for data retrieval purposes. However, the sheer number of documents containing such textual data may make it difficult for users to find what they are looking for in a reasonable time and in a logical way.

SUMMARY

A computer-implemented method according to one embodiment includes identifying a plurality of documents associated with a predetermined subject, where each of the plurality of documents contains textual data, analyzing the textual data of each of the plurality of documents to identify one or more categories within the plurality of the documents, and returning the one or more categories identified within the plurality of the documents.

According to another embodiment, a computer program product for identifying one or more categories within textual data of each of a plurality of documents comprises a computer readable storage medium having program instructions embodied therewith, wherein the computer readable storage medium is not a transitory signal per se, and where the program instructions are executable by a processor to cause the processor to perform a method. The method comprises identifying, by the processor, a plurality of documents associated with a predetermined subject, where each of the plurality of documents contains the textual data, analyzing, by the processor, the textual data of each of the plurality of documents to identify the one or more categories within the plurality of the documents, and returning, by the processor, the one or more categories identified within the plurality of the documents.

A system according to another embodiment includes a processor and logic integrated with and/or executable by the processor, where the logic is configured to identify a plurality of documents associated with a predetermined subject, where each of the plurality of documents contains textual data, analyze the textual data of each of the plurality of documents to identify one or more categories within the plurality of the documents, and return the one or more categories identified within the plurality of the documents.

Other aspects and embodiments of the present invention will become apparent from the following detailed description, which, when taken in conjunction with the drawings, illustrate by way of example the principles of the invention.

DETAILED DESCRIPTION

Figure 1:
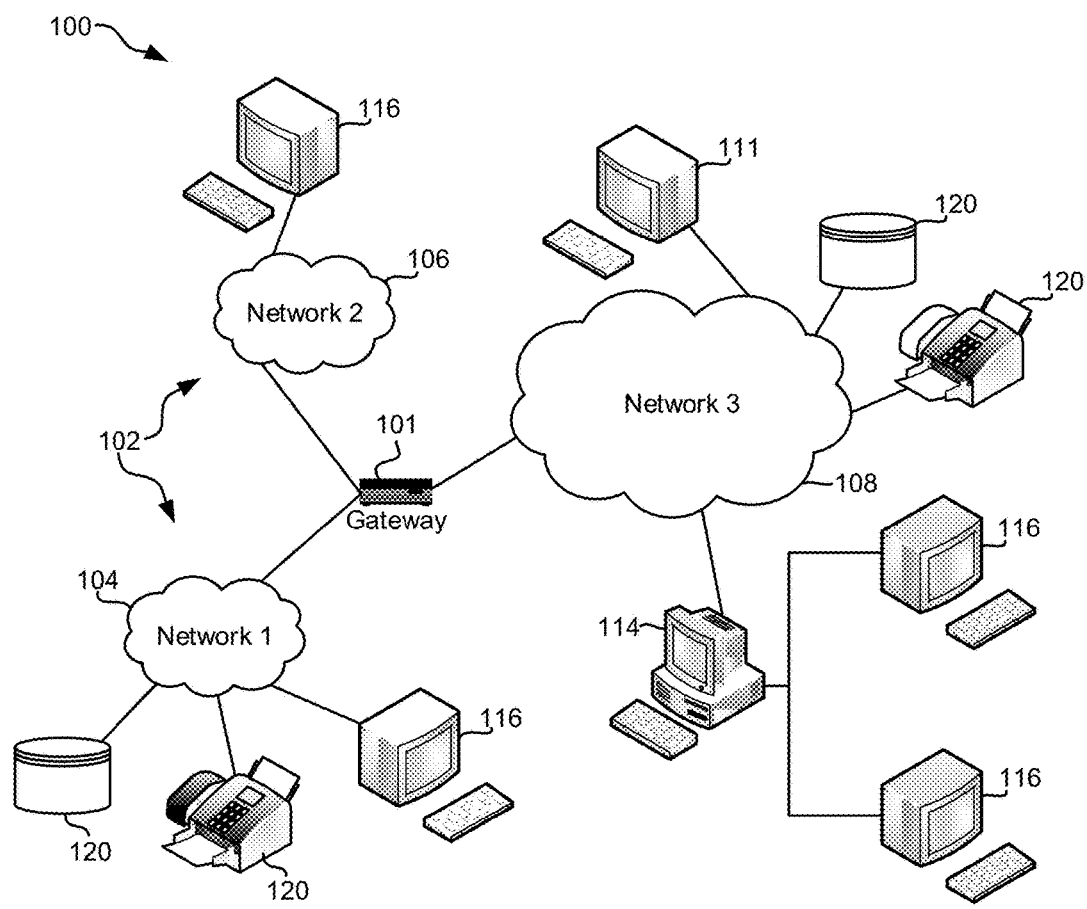
FIG. 1 illustrates a network architecture, in accordance with one embodiment.

The following description discloses several preferred embodiments of systems, methods and computer program products for identifying categories within textual data. Various embodiments provide a method to refine, analyze, and categorize textual data.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying categories within textual data.

In one general embodiment, a computer-implemented method includes identifying a plurality of documents associated with a predetermined subject, where each of the plurality of documents contains textual data, analyzing the textual data of each of the plurality of documents to identify one or more categories within the plurality of the documents, and returning the one or more categories identified within the plurality of the documents.

In another general embodiment, a computer program product for identifying one or more categories within textual data of each of a plurality of documents comprises a computer readable storage medium having program instructions embodied therewith, wherein the computer readable storage medium is not a transitory signal per se, and where the program instructions are executable by a processor to cause the processor to perform a method. The method comprises identifying, by the processor, a plurality of documents associated with a predetermined subject, where each of the plurality of documents contains the textual data, analyzing, by the processor, the textual data of each of the plurality of documents to identify the one or more categories within the plurality of the documents, and returning, by the processor, the one or more categories identified within the plurality of the documents.

In another general embodiment, a system includes a processor and logic integrated with and/or executable by the processor, where the logic is configured to identify a plurality of documents associated with a predetermined subject, where each of the plurality of documents contains textual data, analyze the textual data of each of the plurality of documents to identify one or more categories within the plurality of the documents, and return the one or more categories identified within the plurality of the documents.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
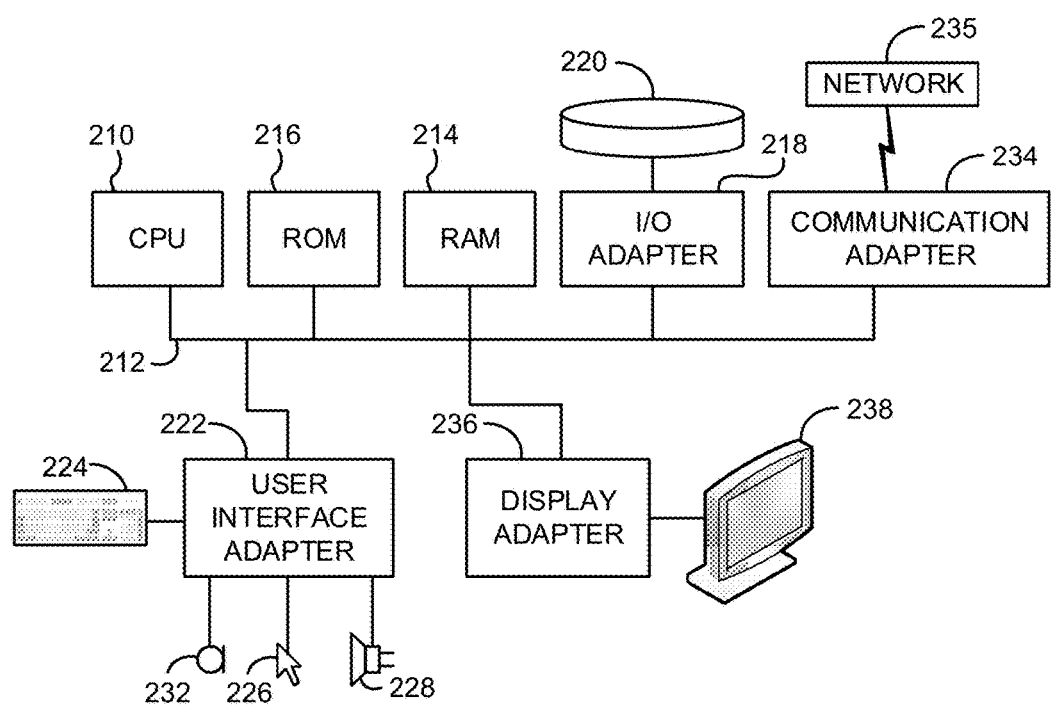
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
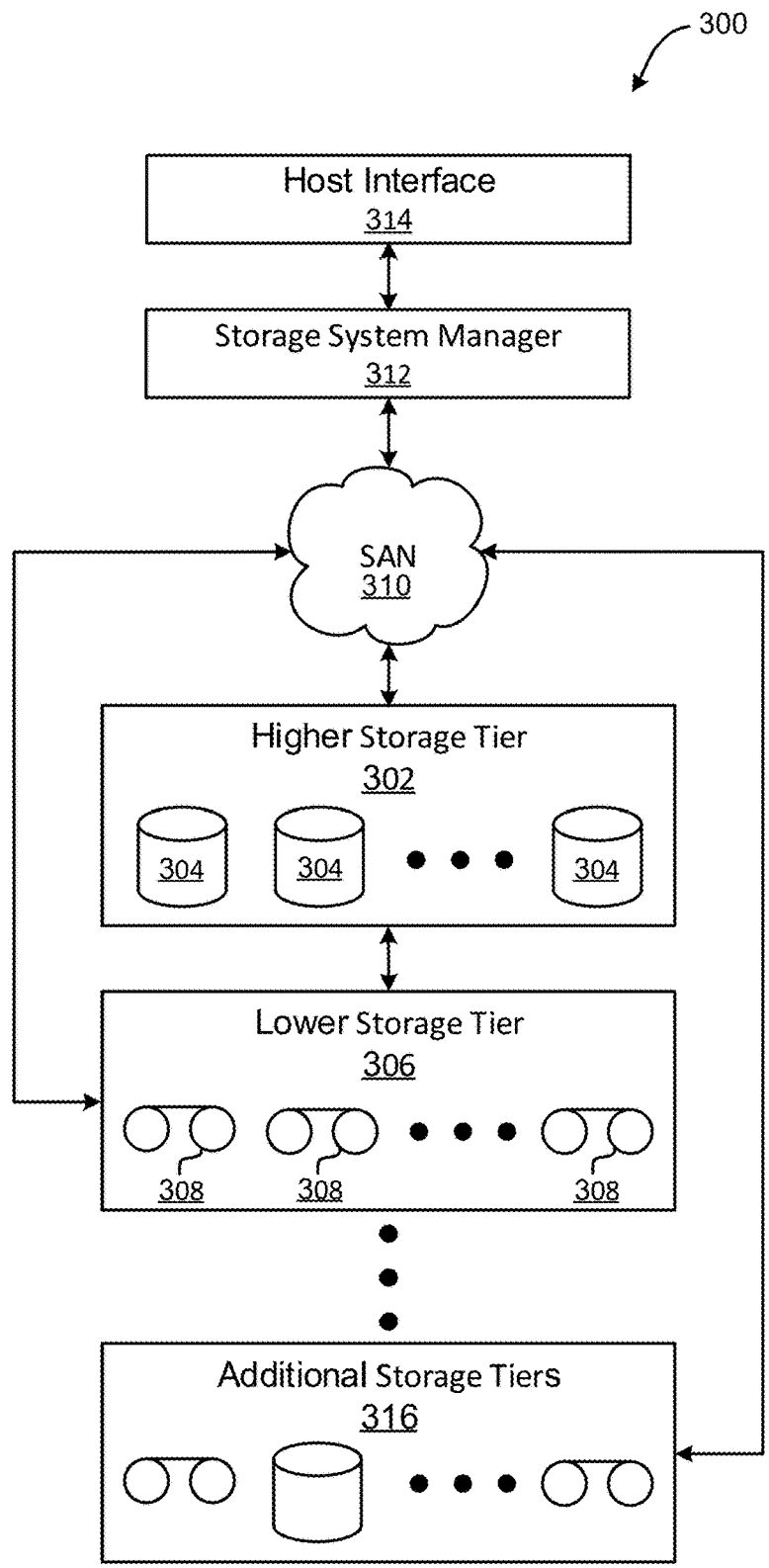
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
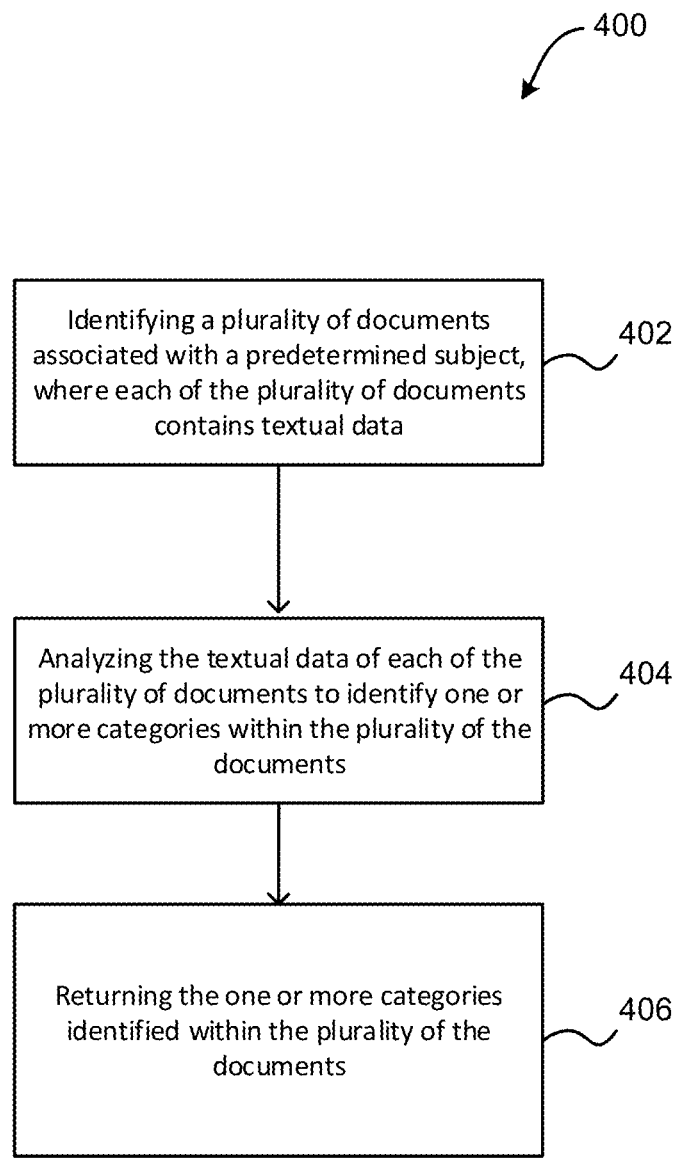
FIG. 4 illustrates a method for identifying categories within textual data, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of documents associated with a predetermined subject are identified, where each of the plurality of documents contains textual data. In one embodiment, one or more of the plurality of documents may include web page content. For example, one or more of the plurality of documents may include all or a portion of a web page. In another embodiment, one or more of the plurality of documents may be created by crawling the Internet (e.g., using one or more web crawlers, spiders, indexers, etc.) and extracting text from results of such crawling.

Additionally, in one embodiment, one or more of the plurality of documents may include scanned content. For example, one or more of the plurality of documents may include all or a portion of a scanned document. In another example, optical character recognition may be performed on the scanned document in order to extract and obtain the textual data from the scanned document. In another embodiment, the textual data may include alphanumerical data. For example, the textual data may include one or more words, sentences, paragraphs, numbers, tables, etc.

Further, in one embodiment, the predetermined subject may include one or more terms that identify common subject matter shared by each of the plurality of documents. For example, the predetermined subject may include one or more general descriptive terms that identify subject matter shared by each of the plurality of documents.

In another embodiment, the plurality of documents may be included within a predetermined grouping. For example, the plurality of documents may be included within a slash tag, where the slash tag groups identifiers of a location of each of the plurality of documents (e.g., hyperlinks, pointers, etc.) within a centralized location. In another example, the slash tag may also include identifiers of one or more of the plurality of documents themselves. In yet another embodiment, the slash tag may include a database, a table, a textual document, or any other data structure or document grouping the plurality of documents. In still another embodiment, the slash tag may be unique to the predetermined subject.

Further still, as shown in FIG. 4, method 400 may proceed with operation 404, where the textual data of each of the plurality of documents is analyzed to identify one or more categories within the plurality of the documents. In one embodiment, analyzing the textual data for each of the plurality of documents may include performing automatic language detection on the textual data. For example, the textual data may be analyzed in order to determine a language in which the textual data is written. In another embodiment, the textual data may be refined by only including textual data written in a predetermined language as refined textual data.

Also, in one embodiment, analyzing the textual data for each of the plurality of documents may include refining the textual data by removing one or more words from the textual data. For example, the textual data may be stripped of one or more words having a predetermined frequency and a predetermined significance. In another example, one or more predetermined words (e.g., "common" words, plural or verb conjugation endings, etc.) may be removed from the textual data to create the refined textual data.

In addition, in one embodiment, analyzing the textual data for each of the plurality of documents may include refining the textual data by removing any duplicate documents within the plurality of documents. For example, textual data that is determined to be duplicated within the plurality of documents may be removed so that only a single instance of such textual data is included in the refined textual data.

Furthermore, in one embodiment, analyzing the textual data for each of the plurality of documents may include performing a latent dirichlet allocation (LDA) analysis on the refined textual data to identify the one or more categories. For example, performing the LDA analysis on the refined textual data may include transforming the refined textual data into an array (e.g., a bag-of-words array, etc.) and determining the one or more categories from the array.

Further still, in one embodiment, the one or more categories may each include one or more topic vectors, where each topic vector includes one or more identified keywords within the refined textual data as well as a frequency of the one or more keywords within the refined textual data. In another embodiment, the topic vectors may be analyzed to identify textual data that is included in a number of topic vectors that is below a threshold level. In yet another embodiment, topic vectors that include the identified textual data may be removed from the identified topic vectors.

In another embodiment, analyzing the textual data for each of the plurality of documents may include performing any other type of analysis. For example, analyzing the textual data may include performing one or more of natural language subject, object, and predicate extraction.

Also, as shown in FIG. 4, method 400 may proceed with operation 406, where the one or more categories identified within the plurality of the documents are returned. In one embodiment, the one or more categories may be linked to the predetermined subject and returned as categories indicative of the predetermined subject. In another embodiment, the one or more categories may be saved in association with the predetermined subject.

Additionally, in one embodiment, the one or more categories may be used to perform classification of additional textual data. For example, additional textual data (e.g., scanned and OCR'd data, web page textual content, etc.) may be compared to the one or more categories to generate a probability that the unprocessed textual data is associated with the predetermined subject linked to the one or more categories. In this way, the one or more categories identified within the plurality of the documents may be used to classify unprocessed textual data.

Figure 5:
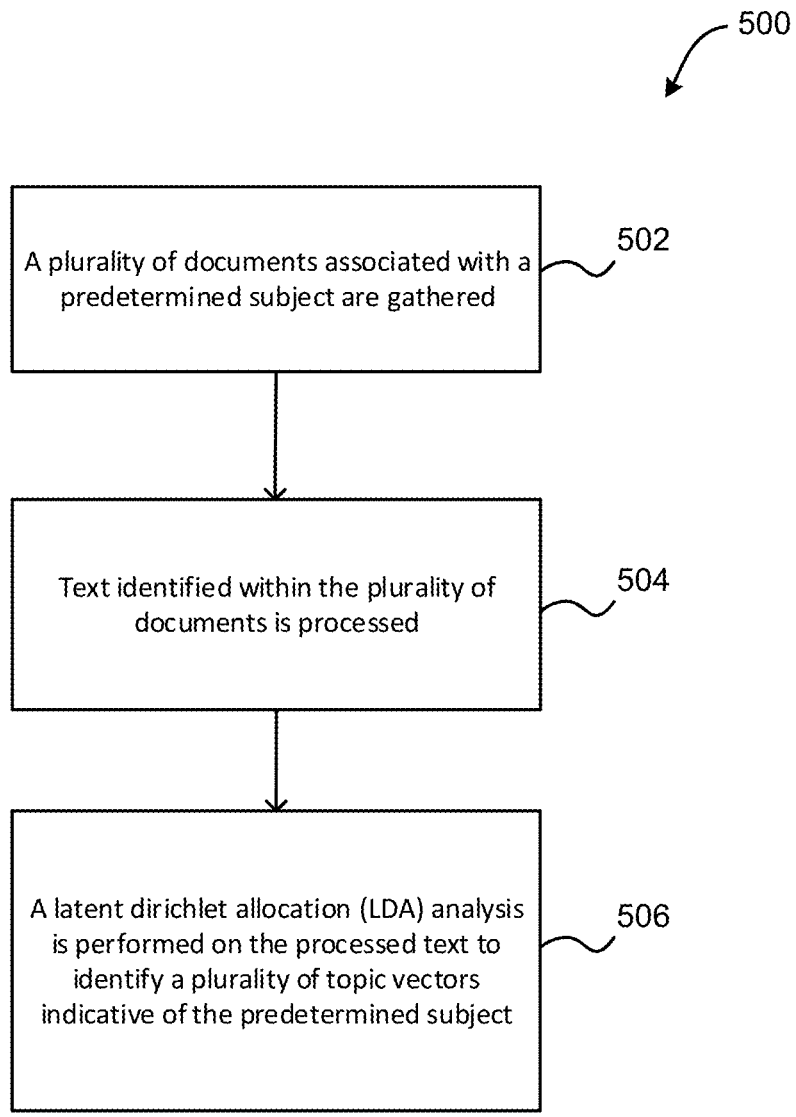
FIG. 5 illustrates a method for performing a latent dirichlet allocation (LDA) analysis on text, in accordance with one embodiment.

Now referring to FIG. 5, a flowchart of a method 500 for performing a latent dirichlet allocation (LDA) analysis on text is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a plurality of documents associated with a predetermined subject are gathered. In one embodiment, the plurality of documents may be web based or non-web based. For example, as part of providing a search index of the Internet, one or more systems may be configured to crawl the Internet searching for web pages, and extracting text, or a subset of web pages and a subset of text. Such an example corpus of text may be indexed for fast quality searches, but also all the extracted text may be saved for later use. In another example, the dataset, which may include any amount of information, for example a petabyte of information, may be stored in a data storage. In another embodiment, a database (e.g., a nosql database system, etc.) may provide scalable rapid access as needed.

Additionally, in one embodiment, the predetermined subject may include a slash tag, and the plurality of documents may be gathered in association with the slash tag. In another embodiment, slash tags may include test tags, admin tags, tags created for certain business partners for specific uses, group tags for managing other tags, etc. In yet another embodiment, one or more document sets may be built for each of these slash tags through any of various ways, including using expert librarians to determine websites of high quality on each slash tag subject.

Further, in one embodiment, identified pages may have supplementary information like user lists on a web forum, or mailing addresses, or legal agreements. In another embodiment, a predetermined portion of the data in a slash tag's document set may be about the underlying subject. In this way, getting the most probable sets of topics is diagnostic of a subject, even if not all the training data is pure. In yet another embodiment, separate text extraction jobs for each of these slash tags may run over the nosql database, to extract text for each given subject.

Further still, method 500 may proceed with operation 504, where text identified within the plurality of documents is processed. For example, once the raw extracted text is gathered, it may then be processed for analysis. In one embodiment, as part of the gathering of text, before saving it to local disk, automatic language detection may be performed. For example, this may be performed using one or more methodologies. For instance, an open source chromium compact language detection library (CLD) may be utilized to determine the language of the text.

Also, in one embodiment, only documents written in a predetermined language (e.g., English-text documents, etc.) may be saved. In another embodiment, processing the text may include stripping the text of all words that have no significance in classifying the text. Such words may be referred to as stop words, which, for example, may be words found at a high frequency such as, "a" and "the." If left in, the LDA analysis may have these words as strong in all topic vectors produced, which would mean that the words may have no significance in classifying the text.

In addition, in one embodiment, because certain aspects may be used to develop an automatic way to determine words that are diagnostic of a subject, small common words that form the grammar of the language may not be diagnostic of any particular subject. Thus, in another embodiment, these stop words may be stripped from the text to increase the significance of the remaining words for classification.

Furthermore, in one embodiment, processing the text may include stemming one or more words within the text by removing plural or verb conjugation endings. For example, words with separate ends may be analyzed with the same significance. This may be performed using a Lingua::Stem::En module for perl for example. In another embodiment, processing the text may include checking all documents within each subject to remove duplicate documents so the system saves only unique documents. In another embodiment, the order of these documents may then be randomized, and the set may be divided into training and test data with an 80/20 split, for example.

Further, method 500 may proceed with operation 506, where a latent dirichlet allocation (LDA) analysis is performed on the processed text to identify a plurality of topic vectors indicative of the predetermined subject. In one embodiment, the processed text may include the gathered documents from the curated slash tag. In this way, the documents may be used to provide a distinct corpus for the predetermined subject covered by the slash tag. In another embodiment, each this distinct corpus may be analyzed to determine one or more topic vectors within the corpus using LDA analysis.

Further still, in one embodiment, a number of topic vectors may be based on a number of documents associated with the processed text. For example, a number of topic vectors to use for analysis may be equal to the square root of half of the number of documents. In another embodiment, the LDA analysis may be performed using a Gensim library for python.

Also, in one embodiment, performing the LDA analysis may include reading in and splitting up documents into text words, where only words that existed in two or more documents may be analyzed. In another embodiment, performing the LDA analysis may include producing a dictionary of these words, which may provide a unique integer for each word. In another embodiment, performing the LDA analysis may include converting the one or more documents into a bag-of-words array, where only the word, represented as an integer, and the number of times it was used is saved. These bag-of-word arrays may then be analyzed using LDA to find the resulting topic vectors.

Additionally, in one embodiment, the LDA analysis may be performed separately for each subject, correlating to the number of slash tags utilized in the example. In another embodiment, the production may be managed on computer clusters. In yet another embodiment, each example job may produce a set of unit topic vectors, with words (as integers) and frequencies.

Further, in one embodiment, to reduce an effect of spam, the topic vectors may be analyzed, such that if one topic vector is determined to use words that are rarely used in other topic vectors, then it is labeled as a bad topic label. In another embodiment, documents containing a predetermined number of words included within vectors having a bad topic label may be removed from the corpus of documents. The LDA analysis may then be repeated, without these removed documents.

Further still, in one embodiment, the data, slash tags and information may be updated and refined. For example, the predetermined subject may be removed if a number of topic vectors identified therein are below a threshold value and/or if usage of the predetermined subject is below a threshold. In another embodiment, the processing and analysis of document text may be repeated periodically as the data set changes.

Figure 6:
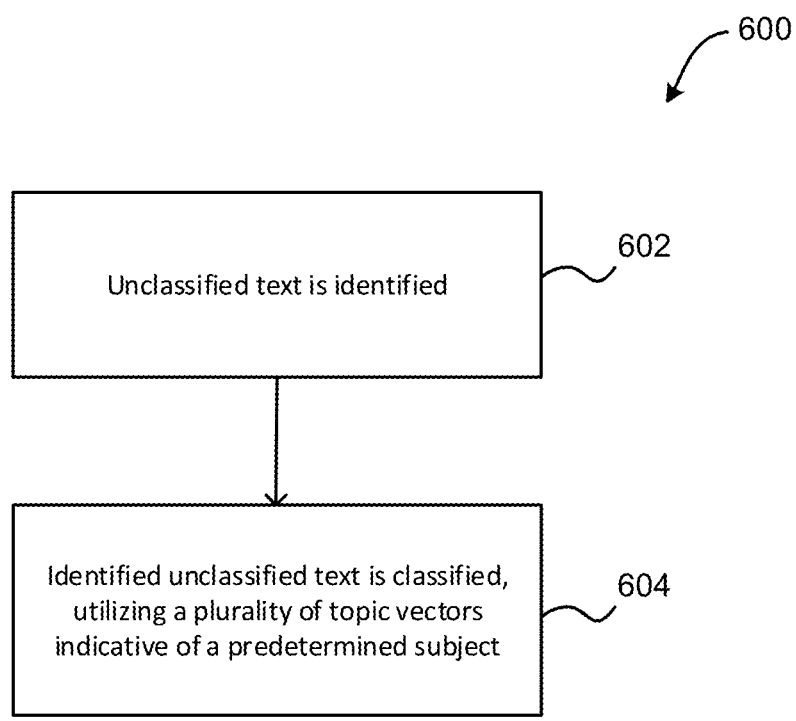
FIG. 6 illustrates a method for classifying text using topic vectors, in accordance with one embodiment.

Now referring to FIG. 6, a flowchart of a method 600 for classifying text using topic vectors is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where unclassified text is identified. Additionally, method 600 may initiate with operation 604, where the identified unclassified text is classified, utilizing a plurality of topic vectors indicative of a predetermined subject. In one embodiment, after a complete set of topic vectors are produced, the set of vectors may be used for subject classification. For example, text may be processed and then compared to these topic vectors to generate probabilities as to what slash-tag (subject) set it may be in.

Additionally, in one embodiment, the topic vectors may be limited to only words that have a certain strength, for example, of more than 0.01. Any words with a strength less than the predetermined strength in a topic vector may be ignored. A dictionary may be produced with all words from all topic vectors of all subjects, and saved, to provide a unique mapping of words used to integers.

Further, in one embodiment, any unclassified text may be processed in the same way as the text was analyzed, with the removal of stop words and stemming. Then the words may be turned into integers using the dictionary, any words not in the dictionary may be ignored. In certain examples, the unclassified text may then be turned into a bag-of-words, including integers and the number of times the integers occur in a given document. This bag of words may then be turned into a unit vector, where all the occurrences are normalized to the overall length.

Further still, in one embodiment, the unit vector may be compared to all the produced topic vectors by taking the dot product of the two, where the dot product is an algebraic operation that takes two numbers of equal length and returns a single number. All the dot products for all vectors in a given subject may then be summed to provide a strength score for that subject for the given text.

For example, in any subject there may be many topic vectors and for most of these vectors the dot product will be close to zero, even if the given text is about that subject. Since there are some subjects with hundreds of topic vectors, there may be hundreds of small dot products that may provide a significant score even when they are close to zero. In another embodiment, discrimination may be applied where any dot product that has a value less than a certain threshold (e.g., 0.2, etc.) is ignored and only stronger dot products above the threshold are summed for the score. In another embodiment, this threshold may be empirically verified against the test set, to provide a better classification to subject.

Also, in one embodiment, a number of topics may be widely different, with some subjects having orders of magnitude less topic vectors than others. Such an example scoring may not be equal given the differences in numbers. A linear scaling on the score based on the number of topic vectors may be applied, which may reduce the score of the largest subject. In some examples the reduction may be up to 30%. This may provide a fairness correction to the score, which may help in the classification.

In addition, in exemplary test examples, once all scores are calculated for all the subjects, then these scores may be sorted, and the most probable subjects may be returned, which may provide an array of subjects and strengths. In another embodiment, hashes may be used to store the topic vectors to provide a simple lookup of words and strengths in the code.

Further, in one embodiment, one or more topic vectors may be changed from hashes of words and strengths to an ordered byte stream (e.g., an ordered byte stream of 4-byte integers, etc.) with another array of strengths (e.g., 4-byte floating-point strengths, etc.). These may then be accessed as arrays in a complied c routine, and may be cached in high performance memory. This may change the classification time from a few seconds each, to a little less than a tenth of a second to classify each document.

In one embodiment, a large set of web sites linked to slash tags may be created, where the slash tags include defined subjects of high quality data. These websites may represent a small percentage of data available on the Internet, but may provide a high quality set of text for each defined subject. Text from these high quality websites may be processed by computer systems using Latent Dirichlet Allocation (LDA) analysis to determine sets of topics for each subject. These sets of topics may then be used to classify any text, to determine an array of most probable subjects. In this way, the previously uncategorized sources of text may be analyzed and categorized by subject automatically, which may improve a number of uses such as indexing, data matching, and searching.

In another embodiment, natural language processing (NLP) and matrix inversion of the word space to the document space may be used to reduce the complexity of the natural text. With the wide availability of large scale computing power, larger and larger set of documents may be used, and the complexity may be reduced such that general information about the text may be determined.

One technique that may be used for data reduction is Latent Dirichlet Allocation (LDA), where for a set of documents a set of topics is assumed and for each topic a set of words and strengths is assumed. Then, using a Bayesian analysis, the most probable sets of words for the topics may be calculated. These topics may be related sets of words that appear repeatedly, most probably at the frequencies calculated. In this way the space of words and documents may be reduced to a space of most common topics, to provide an easier way of handling and calculating general information for a set of documents. Thus, for example, topics may be distributions over words. And we can assign to documents, or sets of documents, a distribution over these topics.

In one embodiment, the space of topic vectors may provide a simplified analysis of documents, which may provide some ability to classify text, and see changing topics over time. In another embodiment, topic vectors may be grouped into subjects, to further reduce the data. For example, a set of topics may be labeled as a certain subject, and then the text may be discussed as an even smaller set of data. This reduction may determine a general subject of a set of documents to see if it can be of use to a general audience.

In another embodiment, slash tags may be defined for a set of subjects that divide up information on the Internet, defining high quality sources of text. In yet another embodiment, one or more users may include searches on data that is only labeled with a particular slash tag. Results may then only look for web pages based on the subject defined by the slash tag, for example, sports, history, fashion, or any of various others.

It should be noted that divisions of data and/or classification systems such as slash tags are used in an exemplary fashion and are not intended to be limiting. Any of various divisions of data and/or classification systems may be used.

In one example, by using slash tags to search, the set of slash tag data may provide a corpus of a large amount of text, which may be labeled with a certain subject. In another example, training data, which has been labeled, may be used for analysis. Using LDA, sets of topic vectors may then be found, which may be related to a certain subject. These sets then may be used to provide classification of any random text, as to what are the most probable subjects that are relevant to that text.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying a plurality of documents associated with a predetermined subject, where:
        each of the plurality of documents contains textual data, and
        the predetermined subject includes one or more terms identifying common subject matter shared by each of the plurality of documents;
    analyzing the textual data of each of the plurality of documents to identify one or more categories within the plurality of the documents, the analyzing including:
        refining the textual data by removing one or more words from the textual data that have a predetermined frequency and a predetermined significance, to create refined textual data,
        transforming the refined textual data into an array, and
        determining the one or more categories from the array, where each of the one or more categories includes a plurality of topic vectors that each include one or more identified keywords and a frequency of the one or more keywords within the refined textual data;
    linking each of the one or more categories to the predetermined subject;
    returning the one or more categories identified within the plurality of the documents as categories indicative of the predetermined subject; and
    classifying additional textual data, utilizing the one or more categories, including comparing the additional textual data to the one or more categories to determine a probability that the additional textual data is associated with the predetermined subject linked to the one or more categories.

2. The computer-implemented method of claim 1, wherein the plurality of documents include one or more of web page content and scanned document content.

3. The computer-implemented method of claim 1, wherein the plurality of documents is included within a grouping that includes a database that groups identifiers of a location of each of the plurality of documents within a centralized location.

4. The computer-implemented method of claim 1, wherein analyzing the textual data for each of the plurality of documents includes performing automatic language detection on the textual data to determine a language in which the textual data is written, where only textual data written in a predetermined language is included within the refined textual data.

5. The computer-implemented method of claim 1, further comprising identifying and removing from one or more of the plurality of topic vectors textual data that is included in a number of topic vectors below a threshold number.

6. The computer-implemented method of claim 1, wherein analyzing the textual data for each of the plurality of documents includes removing one or more duplicate documents within the plurality of documents.

7. The computer-implemented method of claim 1, further comprising stemming one or more words within the textual data by removing one or more plural or verb conjugation endings.

8. The computer-implemented method of claim 1, further comprising:
randomizing an order of the plurality of documents;
dividing the plurality of documents into training documents and test documents;
analyzing the textual data of the training documents, including determining the plurality of topic vectors for the training documents;
identifying and removing from one or more of the plurality of topic vectors textual data that is included in a number of topic vectors below a threshold number; and
empirically verifying the threshold number against the test documents.

9. The computer-implemented method of claim 1, wherein analyzing the textual data for each of the plurality of documents includes performing a latent dirichlet allocation (LDA) analysis on the refined textual data to identify the one or more categories.

10. The computer-implemented method of claim 9, wherein performing the LDA analysis on the textual data includes transforming the textual data into a bag-of-words array and determining the one or more categories from the bag-of-words array.

11. A computer program product for identifying one or more categories within textual data of each of a plurality of documents, the computer program product comprising a computer readable storage medium having program instructions embodied therewith, wherein the computer readable storage medium is not a transitory signal per se, the program instructions executable by a processor to cause the processor to perform a method comprising:
identifying, by the processor, a plurality of documents associated with a predetermined subject, where:
each of the plurality of documents contains the textual data, and
the predetermined subject includes one or more terms identifying common subject matter shared by each of the plurality of documents;
analyzing, by the processor, the textual data of each of the plurality of documents to identify the one or more categories within the plurality of the documents, the analyzing including:
refining the textual data by removing one or more words from the textual data that have a predetermined frequency and a predetermined significance, to create refined textual data,
transforming the refined textual data into an array, and
determining the one or more categories from the array, where each of the one or more categories includes a plurality of topic vectors that each include one or more identified keywords and a frequency of the one or more keywords within the refined textual data;
linking each of the one or more categories to the predetermined subject;
returning, by the processor, the one or more categories identified within the plurality of the documents as categories indicative of the predetermined subject; and
classifying, by the processor, additional textual data, utilizing the one or more categories, including comparing the additional textual data to the one or more categories to determine a probability that the additional textual data is associated with the predetermined subject linked to the one or more categories.

12. The computer program product of claim 11, wherein the plurality of documents include one or more of web page content and scanned document content.

13. The computer program product of claim 11, wherein the plurality of documents is included within a grouping that includes a database that groups identifiers of a location of each of the plurality of documents within a centralized location.

14. The computer program product of claim 11, wherein analyzing, by the processor, the textual data for each of the plurality of documents includes performing, by the processor, automatic language detection on the textual data to determine a language in which the textual data is written, where only textual data written in a predetermined language is included within the refined textual data.

15. The computer program product of claim 11, further comprising identifying and removing from one or more of the plurality of topic vectors textual data that is included in a number of topic vectors below a threshold number, by the processor.

16. The computer program product of claim 11, wherein analyzing, by the processor, the textual data for each of the plurality of documents includes removing, by the processor, one or more duplicate documents within the plurality of documents.

17. The computer program product of claim 11, further comprising stemming one or more words within the textual data by removing one or more plural or verb conjugation endings, by the processor.

18. The computer program product of claim 11, further comprising:
randomizing, by the processor, an order of the plurality of documents;
dividing, by the processor, the plurality of documents into training documents and test documents;
analyzing, by the processor, the textual data of the training documents, including determining the plurality of topic vectors for the training documents;

identifying and removing from one or more of the plurality of topic vectors textual data that is included in a number of topic vectors below a threshold number, by the processor; and empirically verifying the threshold number against the test documents, by the processor.

19. The computer program product of claim 11, wherein analyzing, by the processor, the textual data for each of the plurality of documents includes performing a latent dirichlet allocation (LDA) analysis on the refined textual data to identify the one or more categories.

20. A system, comprising:

a processor; and logic integrated with the processor, executable by the processor, or integrated with and executable by the processor, the logic being configured to:

identify a plurality of documents associated with a predetermined subject, where:

each of the plurality of documents contains textual data, and the predetermined subject includes one or more terms identifying common subject matter shared by each of the plurality of documents;

analyze the textual data of each of the plurality of documents to identify one or more categories within the plurality of the documents, the analyzing including:

refining the textual data by removing one or more words from the textual data that have a predetermined frequency and a predetermined significance, to create refined textual data, transforming the refined textual data into an array, and determining the one or more categories from the array, where each of the one or more categories includes a plurality of topic vectors that each include one or more identified keywords and a frequency of the one or more keywords within the refined textual data;

link each of the one or more categories to the predetermined subject;

return the one or more categories identified within the plurality of the documents as categories indicative of the predetermined subject; and classify additional textual data, utilizing the one or more categories, including comparing the additional textual data to the one or more categories to determine a probability that the additional textual data is associated with the predetermined subject linked to the one or more categories.

* * * * *